(12) United States Patent
Zhu et al.

(10) Patent No.: US 11,647,523 B2
(45) Date of Patent: May 9, 2023

(54) METHOD AND NETWORK DEVICE FOR DATA TRANSMISSION OVER FRONT HAUL INTERFACE

(71) Applicant: Telefonaktiebolaget LM Ericsson (publ), Stockholm (SE)

(72) Inventors: Huaisong Zhu, Beijing (CN); Ming Li, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 16 days.

(21) Appl. No.: 17/268,494

(22) PCT Filed: Aug. 29, 2018

(86) PCT No.: PCT/CN2018/102991
§ 371 (c)(1),
(2) Date: Feb. 15, 2021

(87) PCT Pub. No.: WO2020/042014
PCT Pub. Date: Mar. 5, 2020

(65) Prior Publication Data
US 2021/0314941 A1    Oct. 7, 2021

(51) Int. Cl.
*H04W 72/29* (2023.01)
*H04L 27/26* (2006.01)
(Continued)

(52) U.S. Cl.
CPC ......... *H04W 72/29* (2023.01); *H04L 27/2634* (2013.01); *H04W 28/06* (2013.01);
(Continued)

(58) Field of Classification Search
CPC ......... H04W 72/0433; H04W 72/0446; H04W 72/0453; H04W 72/046; H04W 28/06;
(Continued)

(56) References Cited

U.S. PATENT DOCUMENTS 10,762,426 B2 * 9/2020 Li .................. G06N 3/0454
2011/0310870 A1 * 12/2011 Van Nee .......... H04L 25/0212
375/295
(Continued)

FOREIGN PATENT DOCUMENTS

CN    101197773 A    6/2008
CN    105007106 A    10/2015
WO    2017040002 A1    3/2017

OTHER PUBLICATIONS

Unknown, "Principal component analysis—PCA and information theory", Wikipedia, <https://en.wikipedia.org/wiki/Principal_component_analysis_-_PCA_and_information_theory>, accessed Jan. 6, 2021, 1 page.
(Continued)

*Primary Examiner* — Kan Yuen
(74) *Attorney, Agent, or Firm* — Murphy, Bilak & Homiller, PLLC

(57) ABSTRACT

The present disclosure provides a method (200) in a network device for data transmission over a front haul interface between a first unit and a second unit. The method (200) includes: compressing (210), at the first unit, time domain data in frequency domain and/or spatial domain; transmitting (220) the compressed time domain data along with an
(Continued)

associated compression parameter over the front haul interface from the first unit to the second unit; and decompressing (230), at the second unit, the compressed time domain data based on the compression parameter.

8 Claims, 2 Drawing Sheets

(51) Int. Cl.
  *H04W 28/06* (2009.01)
  *H04W 72/0446* (2023.01)
  *H04W 72/0453* (2023.01)
  *H04W 72/044* (2023.01)
  *H04W 92/12* (2009.01)

(52) U.S. Cl.
  CPC ..... *H04W 72/046* (2013.01); *H04W 72/0446* (2013.01); *H04W 72/0453* (2013.01); *H04W 92/12* (2013.01)

(58) Field of Classification Search
  CPC ..... H04W 92/12; H04W 72/20; H04W 72/29; H04L 27/2634; H04L 5/001; H04L 67/04; H04L 5/0026; H04B 7/0413
  See application file for complete search history.

(56) References Cited

U.S. PATENT DOCUMENTS

| | | | |
|---|---|---|---|
| 2012/0190389 A1* | 7/2012 | Hui | H04B 7/024 455/500 |
| 2012/0203810 A1 | 8/2012 | Ashikhmin et al. | |
| 2013/0324176 A1* | 12/2013 | Cheng | H04W 28/06 455/509 |
| 2015/0372728 A1 | 12/2015 | Rahman et al. | |
| 2017/0374386 A1* | 12/2017 | Morovic | H03M 7/3059 |
| 2018/0041327 A1* | 2/2018 | Wolff | H04L 27/265 |
| 2018/0076871 A1* | 3/2018 | Rahman | H04B 7/0456 |
| 2018/0287673 A1* | 10/2018 | Chang | H04L 69/04 |
| 2019/0319642 A1* | 10/2019 | Abdellatif | A61B 5/7257 |
| 2021/0314941 A1* | 10/2021 | Zhu | H04W 72/046 |

OTHER PUBLICATIONS

Bi, Suzhi, et al., "Wireless Communications in the Era of Big Data", IEEE Communications Magazine, Oct. 2015, 190-199.

Pawar, Sameer, et al., "Front-haul compression using scheduling side information for Cloud Radio Access Networks", 2015 IEEE Global Communications Conference, Dec. 6, 2015, 1-6.

* cited by examiner

METHOD AND NETWORK DEVICE FOR DATA TRANSMISSION OVER FRONT HAUL INTERFACE

TECHNICAL FIELD

The present disclosure relates to wireless communications, and more particularly, to a method and a network device for data transmission over a front haul interface.

BACKGROUND

Most important features supported by the $5^{th}$ Generation (5G) wireless communication systems include a significantly extended air interface bandwidth and a multi-antenna technique. These features impose a heavy burden on a front haul interface, which is an interface between a digital unit (which is typically deployed indoors and may also be referred to as an indoor unit) and a radio unit (which is typically deployed outdoors and may also be referred to as an outdoor unit) of a network device (e.g., a gNB). While the peak throughput over the front haul interface may be very high, the average throughput may be relatively low. Hence, unlike the $3^{rd}$ Generation (3G) and the $4^{th}$ Generation (4G) communication systems, the front haul interface in 5G will be based on packet switch, i.e. only when there is user data transmitted or to be transmitted over the air, there will be packet exchange between the radio unit and the digital unit. There will be no always-on signal exchange.

This is also the case for Machine Type Communication (MTC). A network device (e.g., an MTC base station) can support up to 50,000 MTC terminals per cell, but each terminal may have a very low traffic density, e.g., 1 packet exchange per day or even per week. For such MTC traffic, especially for an MTC base station in a standalone mode, a front haul interface based on packet switch will be an attractive solution.

Since both 5G and MTC use Orthogonal Frequency Division Multiplexing (OFDM) technique in data transmission, a network device (in particular, its digital unit) processes signals in frequency domain. Typically, it converts frequency domain signals into time domain signals by means of Inverse Fast Fourier Transform (IFFT) and time domain signals to frequency domain signals by means of Fast Fourier Transform (FFT).

For the front haul interface, it is important to decide whether the FFT (for downlink) and IFFT (for uplink) functions should be located in the radio (outdoor) unit or the digital (indoor) unit. From the perspective of hardware design, it would be desired to reduce the computational complexity in the outdoor unit due to its tough working environment, i.e., to implement the FFT and IFFT functions in the digital unit. Accordingly, in downlink for example, a frequency domain signal is converted into a time domain signal by means of IFFT at the digital unit and then transmitted to the radio unit. In this case, even if some sub-bands do not contain any signal, the time domain signal will have exactly the same traffic load on the front haul interface as a full load case.

FIG. 1 shows an example of downlink signal transmission in frequency domain vs. time domain. Two carriers, Carrier #1 and Carrier #2, are shown in frequency domain, each having frequency domain signals to be transmitted in an allocated sub-band. Four antennas are shown in spatial domain. When the frequency domain signals are transformed into time domain signals, they will be spread over the entire time window. From the comparison between the upper and lower graphs of FIG. 1, it can be seen that the transmission in frequency domain (using only the allocated sub-bands) can save bandwidth resources when compared with the transmission in time domain.

Accordingly, the network device can transmit frequency domain signals over the front haul interface to save bandwidth resources (e.g., adaptive bandwidth utilization based on the actual traffic load on the air interface), at expense of high complexity at the radio unit (i.e. FFT and IFFT functions at the radio unit). It does provide an improved bandwidth utilization when the air interface load is low, but when the air interface load is high, the bandwidth utilization is still not satisfactory. For a New Radio (NR) cell at 100 MHz as an example, only 10% of the bandwidth can be saved in the worst case.

SUMMARY

It is an object of the present disclosure to provide a method and a network device for data transmission over a front haul interface, capable of achieving a high bandwidth utilization while maintaining a low computational complexity at a radio unit.

According to a first aspect of the present disclosure, a method in a network device for data transmission over a front haul interface between a first unit and a second unit is provided. The method includes: compressing, at the first unit, time domain data in frequency domain and/or spatial domain; transmitting the compressed time domain data along with an associated compression parameter over the front haul interface from the first unit to the second unit; and decompressing, at the second unit, the compressed time domain data based on the compression parameter.

In an embodiment, the operation of compressing can be based on Principal Component Analysis (PCA).

In an embodiment, the operation of compressing can include: determining a compression ratio; determining a compression matrix based on the compression ratio; and compressing the time domain data using the compression matrix.

In an embodiment, the compression parameter can be the compression matrix.

In an embodiment, the method can further include, at the second unit: receiving the compressed time domain data and the compression matrix; and deriving a decompression matrix from the compression matrix. The compressed time domain data is decompressed based on the decompression matrix.

In an embodiment, the compression parameter can be a decompression matrix and the compressed time domain data can be decompressed based on the decompression matrix.

In an embodiment, the decompression matrix can be derived as a conjugate transpose of the compression matrix.

In an embodiment, the first unit can be a digital unit and the second unit can be a radio unit. The method can further include, prior to the operation of compressing: transforming, at the first unit, frequency domain data into the time domain data by means of Inverse Fast Fourier Transform (IFFT).

In an embodiment, the first unit can be a radio unit and the second unit can be a digital unit. The method can further include, subsequent to the operation of decompressing: transforming, at the second unit, the decompressed time domain data into frequency domain data by means of Fast Fourier Transform (FFT).

According to a second aspect of the present disclosure, a network device is provided. The network device includes a first unit and a second unit connected with each other via a front haul interface. The first unit is configured to compress time domain data in frequency domain and/or spatial domain and transmit the compressed time domain data along with an associated compression parameter over the front haul interface to the second unit. The second unit is configured to decompress the compressed time domain data based on the compression parameter.

In an embodiment, the time domain data can be compressed based on Principal Component Analysis (PCA).

In an embodiment, the first unit can be configured to compress the time domain data by: determining a compression ratio; determining a compression matrix based on the compression ratio; and compressing the time domain data using the compression matrix.

In an embodiment, the compression parameter can be the compression matrix.

In an embodiment, the second unit can further be configured to: receive the compressed time domain data and the compression matrix; and derive a decompression matrix from the compression matrix. The compressed time domain data can be decompressed based on the decompression matrix.

In an embodiment, the compression parameter can be a decompression matrix and the compressed time domain data can be decompressed based on the decompression matrix.

In an embodiment, the decompression matrix can be derived as a conjugate transpose of the compression matrix.

In an embodiment, the first unit can be a digital unit and the second unit can be a radio unit. The first unit can further be configured to: transform frequency domain data into the time domain data by means of Inverse Fast Fourier Transform (IFFT).

In an embodiment, the first unit can be a radio unit and the second unit can be a digital unit. The second unit can further be configured to: transform the decompressed time domain data into frequency domain data by means of Fast Fourier Transform (FFT).

With the embodiments of the present disclosure, time domain data is compressed in frequency domain and/or spatial domain, transmitted over the front haul interface along with an associated compression parameter, and then decompressed based on the compression parameter. In this way, the data transmitted over the front haul interface is the time domain data, such that the FFT/IFFT functions can be provided in the digital unit and a low computational complexity can be maintained at the radio unit. Meanwhile, the time domain data is compressed before being transmitted over the front haul interface, such that a high bandwidth utilization can be achieved.

BRIEF DESCRIPTION OF THE DRAWINGS

The above and other objects, features and advantages will be more apparent from the following description of embodiments with reference to the figures, in which.

DETAILED DESCRIPTION

Figure 1:
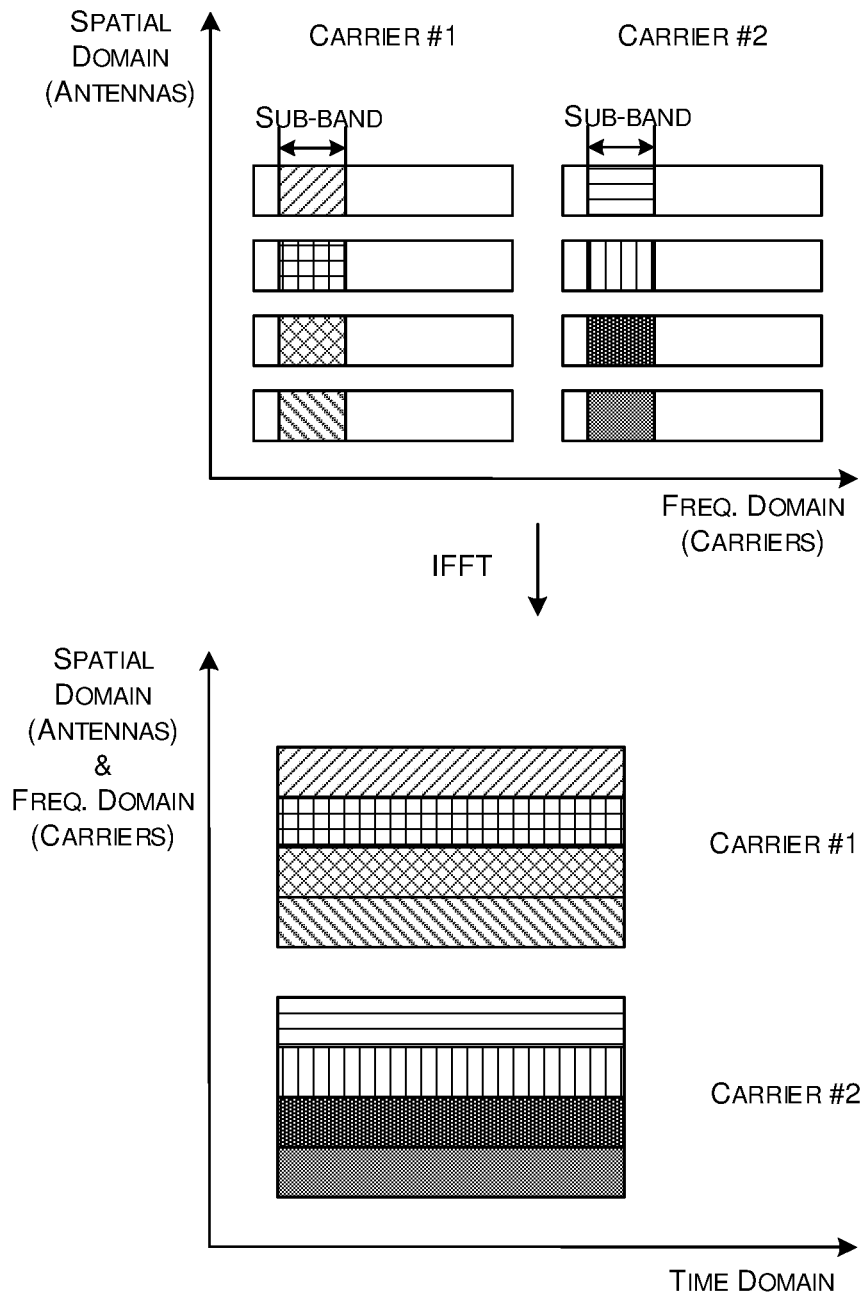
FIG. 1 is a schematic diagram showing an example of downlink signal transmission in frequency domain vs. time domain.

The embodiments of the disclosure will be detailed below with reference to the drawings. It should be appreciated that the following embodiments are illustrative only, rather than limiting the scope of the disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable, and/or other suitable the first generation (1G), the second generation (2G), 2.5G, 2.75G, the third generation (3G), the fourth generation (4G), 4.5G, the future fifth generation (5G) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figure 2:
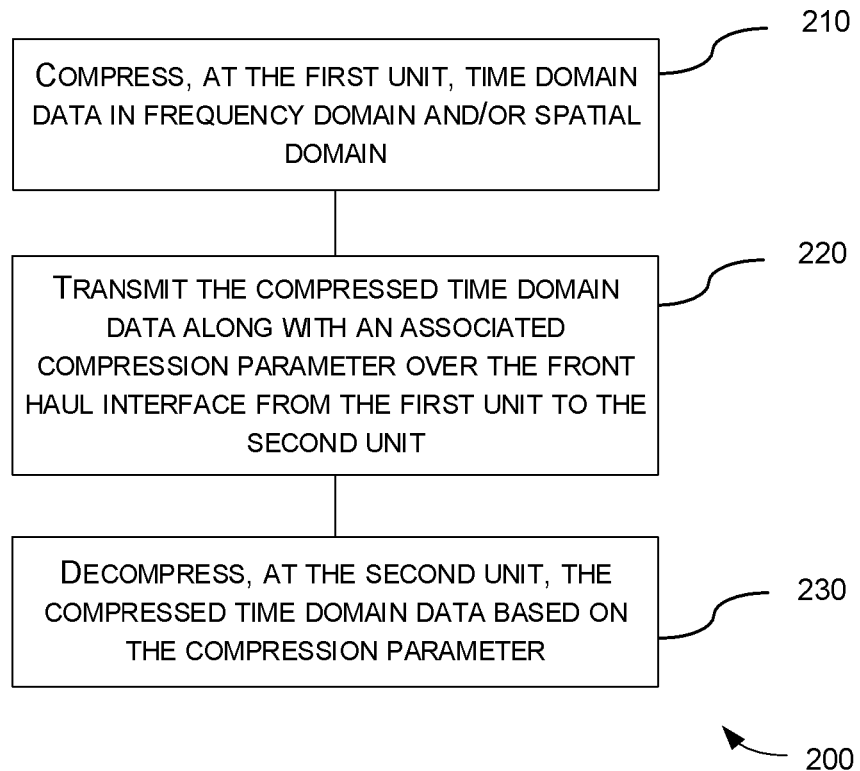
FIG. 2 is a flowchart illustrating a method in a network device for data transmission over a front haul interface according to an embodiment of the present disclosure.

FIG. 2 is a flowchart illustrating a method 200 for data transmission over a front haul interface according to an embodiment of the present disclosure. The method 200 can be performed in a network device including a first unit and a second unit connected with each other via a front haul interface.

At block 210, the first unit compresses time domain data in frequency domain and/or spatial domain.

At block 220, the first unit transmits the compressed time domain data along with an associated compression parameter over the front haul interface to the second unit.

At block 230, the second unit decompresses the compressed time domain data based on the compression parameter.

In the following, the method 200 will be explained in further detail with reference to Example 1 and Example 2.

EXAMPLE 1

This example relates to downlink transmissions. In this example, the first unit is a digital unit and the second unit is a radio unit.

First, the digital unit can transform frequency domain data (e.g., data to be transmitted in downlink) into time domain data by means of Inverse Fast Fourier Transform (IFFT).

In the block 210, the digital unit can compress the time domain data in frequency domain (with respect to carriers) and/or spatial domain (with respect to antennas). In an example, the compression in the block 210 can be based on Principal Component Analysis (PCA). PCA is a statistical procedure that uses an orthogonal transformation to convert a set of observations of possibly correlated variables into a set of values of linearly uncorrelated variables called principal components (or sometimes, principal modes of variation). The number of principal components is smaller than or equal to the smaller of the number of original variables and the number of observations. This transformation is defined in such a way that the first principal component has the largest possible variance (that is, accounts for as much of the variability in the data as possible), and each succeeding component in turn has the highest variance possible under the constraint that it is orthogonal to the preceding components. The resulting vectors constitute an uncorrelated orthogonal basis set.

For example, in the block 210, the PCA-based compression may include the following steps.

At Step 1, the time domain data is prepared, denoted as:

$$X=[\vec{x}_0, \vec{x}_1, \vec{x}_2, \ldots, \vec{x}_{N-1}], \quad (1)$$

where N is the FFT/IFFT length, and $\vec{x}_n$, n=0, 1, . . . , N contains data in spatial domain and frequency domain (assuming there are in total K pairs of antenna and carrier):

$$\vec{x}_n = \begin{bmatrix} x_n(\text{antenna, carrier 1}) \\ x_n(\text{antenna, carrier 2}) \\ \vdots \\ x_n(\text{antenna, carrier } K) \end{bmatrix}. \quad (2)$$

At Step 2, a covariance matrix of X, which is a K*K matrix, is calculated as:

$$R_{XX}=E\{XX^H\}, \quad (3)$$

where $E(\ )$ denotes expectation and $(\ )^H$ denotes Hermitian transpose.

At Step 3, the covariance matrix $R_{XX}$ is subjected to Singular Value Decomposition (SVD):

$$SVD(R_{xx})=U*\Sigma*V^H, \quad (4)$$

where U and V contain eigen vectors and $\Sigma$ is a diagonal matrix containing eigen values.

At Step 4, a compression matrix is determined. First, a compression ratio can be determined. For example, the matrix $\Sigma$ can be written as:

$$\Sigma = \begin{bmatrix} \lambda_1 & & & 0 \\ & \lambda_2 & & \\ & & \ddots & \\ 0 & & & \lambda_K \end{bmatrix}, \quad (5)$$

where $\lambda_i$, i=1, 2, . . . , K is an eigen value of $R_{XX}$ and $\lambda_{i-1} \geq \lambda_i$.

Here, an index i0 is determined, such that $\lambda_{i0}$ is the eigen value having the largest index that is larger than 0 (meaning no compression loss), i.e.:

$$\lambda_{i0}>0 \text{ and } \lambda_{i0+1}=0. \quad (6)$$

Alternatively, an index i0 is determined, such that $\lambda_{i0}$ is the eigen value having the largest index that is larger than a certain threshold Th (meaning a certain level of compression loss), i.e.:

$$\lambda_{i0}>Th \text{ and } \lambda_{i0+1} \leq Th. \quad (7)$$

In either case, the compression ratio is i0/K.

Then, the compression matrix, T, can be determined as a matrix composed of only the first i0 rows of V, i.e.:

$$T=V(1:i0,:). \quad (8)$$

In this case, the decompression matrix, TT, can be derived as a conjugate transpose of the compression matrix T, i.e.:

$$TT=T^H=[V(1:i0,:)]^H. \quad (9)$$

At Step S5, the time domain data is compressed in accordance with:

$$X'=T*X. \quad (10)$$

In this case, the dimension of the data can be reduced from K*N to i0*N.

In the block 220, the digital unit can transmit the compressed time domain data, X', along with an associated compression parameter over the front haul interface to the radio unit.

Here, the compression parameter can be the compression matrix T. In this case, the radio unit can receive the compressed time domain data X' and the compression matrix T, derive the decompression matrix TT from the compression matrix T, e.g., in accordance with Equation (9), and decompress the compressed time domain data X' based on the decompression matrix TT in the block 230 in accordance with:

$$X=TT^*X'. \quad (11)$$

Alternatively, the compression parameter can be the decompression matrix TT. In this case, the decompression matrix TT can be derived at the digital unit, e.g., in accordance with Equation (9), and transmitted to the radio unit along with the compressed data. Accordingly, the radio unit can decompress the compressed time domain data X' based on the decompression matrix TT in the block 230 in accordance with Equation (11).

After the decompression, the dimension of the data can be restored from i0*N to K*N.

EXAMPLE 2

This example relates to uplink transmissions. In this example, the first unit is a radio unit and the second unit is a digital unit.

In the block 210, the radio unit can compress time domain data (e.g., data received in uplink) in frequency domain and/or spatial domain. Here, the PCA-based compression as discussed above in connection with Example 1 can also be applied. Thus, the above Steps 1~5 also apply to this example, only that the compression of the time domain data is performed at the radio unit here.

In the block 220, the radio unit can transmit the compressed time domain data along with an associated compression parameter over the front haul interface from the first unit to the digital unit. As described above in connection with Example 1, the compression parameter can be the compression matrix. In this case the digital unit can receive the compressed time domain data and the compression matrix, and then derive a decompression matrix from the compression matrix, e.g., in accordance with Equation (9). Alternatively, the compression parameter can be the decompression matrix. In this case, the decompression matrix can be derived at the radio unit, e.g., in accordance with Equation (9), and transmitted to the digital unit along with the compressed data.

In the block 230, the digital unit can decompress the compressed time domain data based on the compression parameter.

Then, the digital unit can transform the decompressed time domain data into frequency domain data by means of Fast Fourier Transform (FFT).

Figure 3:
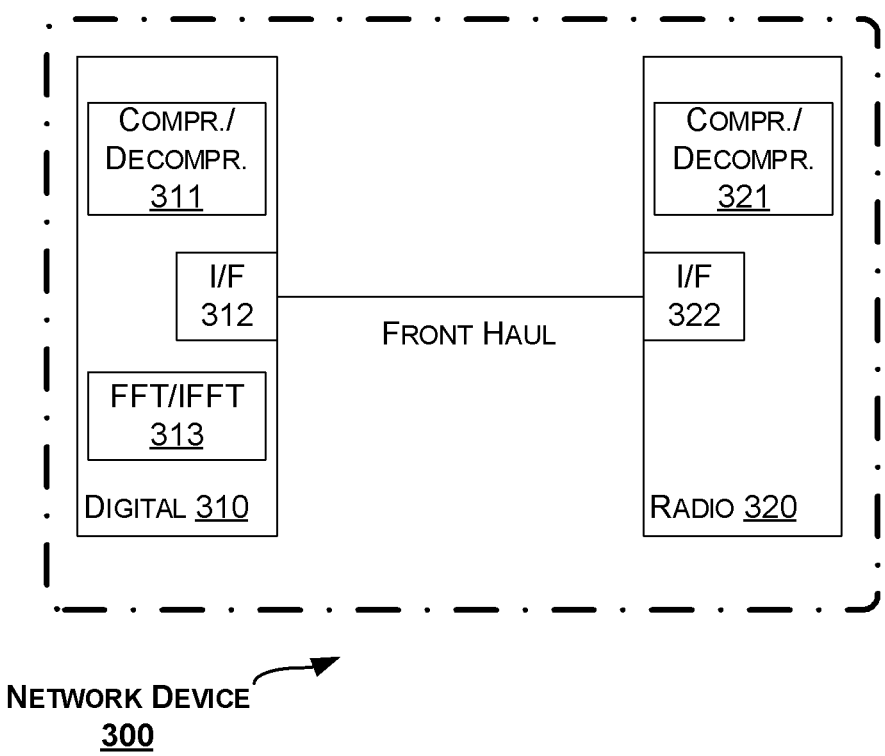
FIG. 3 is a block diagram of a network device according to an embodiment of the present disclosure.

Correspondingly to the method 200 as described above, a network device is provided. FIG. 3 is a block diagram of a network device 300 according to an embodiment of the present disclosure.

As shown, the network device 300 includes a digital unit 310 and a radio unit 320 connected to each other via a front haul interface.

In an example, the digital unit 310 (or particularly a compression/decompression unit 311) can be configured to compress time domain data in frequency domain and/or spatial domain. The digital unit 310 (or particularly an interface unit 312) can be further configured to transmit the compressed time domain data along with an associated compression parameter over the front haul interface to the radio unit 320. The radio unit 320 (or particularly a compression/decompression unit 321) can be configured to decompress the compressed time domain data based on the compression parameter.

For example, the PCA-based compression and decompression as described above in connection with the method 200 can also be applied to the network device 300 (or particularly the compression/decompression unit 311 and the compression/decompression unit 321).

In particular, the digital unit 310 (or particularly a compression/decompression unit 311) can be configured to compress the time domain data by: determining a compression ratio; determining a compression matrix based on the compression ratio; and compressing the time domain data using the compression matrix.

In an example, the compression parameter can be the compression matrix. The radio unit 320 (or particularly an interface unit 322) can be further configured to receive the compressed time domain data and the compression matrix. The radio unit 320 (or particularly the compression/decompression unit 321) can be further configured to derive a decompression matrix from the compression matrix and decompress the compressed time domain data based on the decompression matrix. Alternatively, the compression parameter can be a decompression matrix and the radio unit 320 (or particularly the compression/decompression unit 321) can be further configured to decompress the compressed time domain data based on the decompression matrix. In an example, the decompression matrix can be derived as a conjugate transpose of the compression matrix.

In an example, the digital unit 310 (or particularly an FFT/IFFT unit 313) can be further configured to transform frequency domain data into the time domain data by means of IFFT.

Alternatively or additionally, the radio unit 320 (or particularly a compression/decompression unit 321) can be configured to compress time domain data in frequency domain and/or spatial domain. The radio unit 320 (or particularly an interface unit 322) can be further configured to transmit the compressed time domain data along with an associated compression parameter over the front haul interface to the digital unit 310. The digital unit 310 (or particularly a compression/decompression unit 311) can be configured to decompress the compressed time domain data based on the compression parameter.

For example, the PCA-based compression and decompression as described above in connection with the method 200 can also be applied to the network device 300 (or particularly the compression/decompression unit 311 and the compression/decompression unit 321).

In particular, the radio unit 320 (or particularly a compression/decompression unit 321) can be configured to compress the time domain data by: determining a compression ratio; determining a compression matrix based on the compression ratio; and compressing the time domain data using the compression matrix.

In an example, the compression parameter can be the compression matrix. The digital unit 310 (or particularly an interface unit 312) can be further configured to receive the compressed time domain data and the compression matrix. The digital unit 310 (or particularly the compression/decompression unit 311) can be further configured to derive a decompression matrix from the compression matrix and decompress the compressed time domain data based on the decompression matrix. Alternatively, the compression parameter can be a decompression matrix and the digital unit 310 (or particularly the compression/decompression unit 311) can be further configured to decompress the compressed time domain data based on the decompression matrix. In an example, the decompression matrix can be derived as a conjugate transpose of the compression matrix.

In an embodiment, the digital unit 310 (or particularly an FFT/IFFT unit 313) can further be configured to transform the decompressed time domain data into frequency domain data by means of FFT.

The above units 311-313 and 321-322 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above and illustrated e.g., in FIG. 2.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a network device for data transmission over a front haul interface between a first unit and a second unit, wherein the network device comprises the first unit and the second unit, the method comprising:
    compressing, at the first unit, time domain data in a frequency domain and/or a spatial domain, wherein compressing the time domain data comprises determining a compression ratio, determining a compression matrix based on the compression ratio, and compressing the time domain data using the compression matrix;
    transmitting the compressed time domain data along with an associated compression parameter over the front haul interface from the first unit to the second unit;
    receiving, at the second unit, the compressed time domain data and the compression parameter;
    determining, at the second unit, a decompression matrix from the compression parameter, wherein either:
        the compression parameter is the compression matrix and determining the decompression matrix comprises deriving the decompression matrix from the compression matrix; or
        the compression parameter is the decompression matrix derived by the first unit as a conjugate transpose of the compression matrix; and
    decompressing, at the second unit, the compressed time domain data based on the determined decompression matrix.

2. The method of claim 1, wherein said compressing is based on Principal Component Analysis (PCA).

3. The method of claim 1, wherein the first unit is a digital unit and the second unit is a radio unit, and wherein the method further comprises, prior to said compressing:
    transforming, at the first unit, frequency domain data into the time domain data by means of Inverse Fast Fourier Transform (IFFT).

4. The method of claim 1, wherein the first unit is a radio unit and the second unit is a digital unit, and wherein the method further comprises, subsequent to said decompressing:
    transforming, at the second unit, the decompressed time domain data into frequency domain data by means of Fast Fourier Transform (FFT).

5. A network device comprising:
    a first unit and a second unit connected with each other via a front haul interface;
    wherein the first unit comprises processing circuitry configured to:
        compress time domain data in a frequency domain and/or a spatial domain by determining a compression ratio, determining a compression matrix based on the compression ratio, and compressing the time domain data using the compression matrix; and
        transmit the compressed time domain data along with an associated compression parameter over the front haul interface to the second unit; and
    wherein the second unit comprises processing circuitry configured to:
        receive the compressed time domain data and the compression parameter;
        determine a decompression matrix from the compression parameter, wherein either:
            the compression parameter is the compression matrix and the processing circuitry of the second unit is configured to determine the decompression matrix by deriving the decompression matrix from the compression matrix; or
            the compression parameter is the decompression matrix derived by the first unit as a conjugate transpose of the compression matrix; and
        decompress the compressed time domain data based on the determined decompression matrix.

6. The network device of claim 5, wherein the time domain data is compressed based on Principal Component Analysis (PCA).

7. The network device of claim 5, wherein the first unit is a digital unit and the second unit is a radio unit, and wherein the first unit comprises processing circuitry further configured to:
    transform frequency domain data into the time domain data by means of Inverse Fast Fourier Transform (IFFT).

8. The network device of claim 5, wherein the first unit is a radio unit and the second unit is a digital unit, and wherein the second unit comprises processing circuitry further configured to:
    transform the decompressed time domain data into frequency domain data by means of Fast Fourier Transform (FFT).

* * * * *